United States Patent [19]

Quatrini

[11] 4,256,708
[45] Mar. 17, 1981

[54] PROCESS FOR RECOVERING TUNGSTEN FROM CEMENTED TUNGSTEN CARBIDE

[75] Inventor: Lucretia R. Quatrini, Athens, Pa.

[73] Assignee: GTE Products Corporation, Stamford, Conn.

[21] Appl. No.: 107,232

[22] Filed: Dec. 26, 1979

[51] Int. Cl.³ .............................................. C01G 41/00
[52] U.S. Cl. ..................................... 423/61; 423/138; 423/53
[58] Field of Search ......................... 423/53, 55, 58, 61

[56] References Cited

U.S. PATENT DOCUMENTS

| 2,704,240 | 3/1955 | Avery | 423/53 |
| 3,635,674 | 1/1972 | Shwayder | 423/53 |
| 3,887,680 | 6/1975 | MacInnis et al. | 423/61 |

FOREIGN PATENT DOCUMENTS 623577  5/1949  United Kingdom ...................... 423/53

*Primary Examiner*—Herbert T. Carter
*Attorney, Agent, or Firm*—Robert E. Walter

[57] ABSTRACT

In a process for recovering tungsten from cemented tungsten carbide, the cemented tungsten carbide is oxidized to form an oxidized product which is digested in an aqueous solution of an alkali metal hydroxide to form a water soluble alkali metal tungstate portion and an insoluble portion. The improvement of the present invention provides for recovery of tungsten values from the above mentioned insoluble portion by digesting the insoluble portion in an aqueous alkali metal hydroxide solution with a suitable amount of titanium oxide to promote the formation of a soluble alkali metal tungstate.

1 Claim, No Drawings

PROCESS FOR RECOVERING TUNGSTEN FROM CEMENTED TUNGSTEN CARBIDE

BACKGROUND OF THE INVENTION

This invention relates to the recovery of tungsten values from scrap cemented tungsten carbide. More particularly, it relates to an improved process for recovering tungsten from the oxidation product of a cemented tungsten carbide.

Recovery of tungsten values from scrap tungsten carbide has been a problem in the carbide industry for a number of years. Cemented carbide tools are made by consolidating extremely hard and fine metal carbide particles together with a suitable binder or cement. Typically, such tools contain tungsten carbide cemented with cobalt although additional carbides such as the carbides of titanium, vanadium, chromium or molybdenum may also be present.

Cobalt is the most widely used cementing material although other cementing materials such as iron, nickel, chromium or molybdenum may be employed. Since all of the materials used in the cemented carbides are extremely valuable it is desirable to reclaim the materials found therein.

Various processes have been used in the past with varying degrees of success. U.S. Pat. No. 3,953,194 to Hartline et al describes a process for the reclaiming cemented metal carbide material by subjecting the metal carbide material to catastrophic oxidation to produce a mixture of metal oxide and the oxide of the cement. The resulting oxide is reduced and finally carbonized.

Another process described in U.S. Pat. No. 3,887,680 to MacInnis, Vanderpool and Boyer wherein tungsten carbide containing an iron group metal such as cobalt is oxidized from a friable oxidation product. The oxidation product is then ground and treated by digesting it in an aqueous solution of alkali metal hydroxide under controlled conditions to recover tungsten values.

U.S. patent application Ser. No. 827,745 entitled Oxidation of Tungsten Carbide, filed Aug. 25, 1977, to Vanderpool et al relates to a process wherein cemented tungsten carbide pieces are heated to a red glow in an enriched atmosphere of oxygen to result in a self-sustaining reaction whereby the pieces continue to oxidize after removal of heat.

U.S. Pat. No. 3,256,058 to Burwell describes a process wherein tungsten is recovered from wolframite or scheelite by fusing the ore at a temperature in excess of 698° C. with a fusion mixture containing sodium carbonate, sodium chloride and sodium nitrate in a specific proportion.

Oxidation of cemented tungsten carbide by heating an oxygen containing atmosphere has proven to be a beneficial process. The present invention is directed to an improvement of this process.

SUMMARY OF THE INVENTION

According to prior art process as described in U.S. Pat. No. 3,887,680 to MacInnis et al, oxidation of cemented carbides followed by digestion of the oxidized product in an aqueous solution of an alkali metal hydroxide results in high yields of tungsten in a filtrate with the resulting sludge containing the iron group metal.

It is an object of the present invention to obtain a high yield of tungsten from the sludge produced by the above process thereby permitting the use of lower concentrations of alkali metal hydroxide solution during the initial digestion of the cemented carbide.

In accordance with the present invention, there is provided an improvement in a process for recovering tungsten from cemented tungsten carbide wherein cemented tungsten carbide is oxidized to form an oxidized product which is digested in an aqueous solution of an alkali metal hydroxide to form a water soluble alkali metal tungstate portion and an insoluble portion, the improvement of the present process comprises digesting in an aqueous alkali metal hydroxide solution with a suitable amount of titanium oxide to promote the formation of a soluble alkali metal tungstate.

DETAILED DESCRIPTION OF PREFERRED EMBODIMENTS

The present invention is primarily concerned with an improvement to the basic processes described in U.S. Pat. No. 3,887,680 to MacInnis et al. According to the processes described in the above patent, scrap tungsten carbide is oxidized in air at a temperature preferably from about 825° C. to about 850° C. Although higher temperatures and lower temperatures can be used, the oxidation rate is slowed at temperatures below 825° C.

According to the process of the above patent, the oxidized cement tungsten carbide product mushrooms and forms friable product which can be easily ground to powder form. The powder is charged to an aqueous solution of an alkali metal hydroxide and is heated under pressure for a number of hours. The iron group metal tungstate that is formed is converted to a water soluble alkali metal tungstate and the iron group metal is in insoluble form thereby allowing a separation of the tungsten values from the iron group of metals. The term iron group metals as used herein refers to the binder material which is most commonly cobalt although other metals as hereinbefore mentioned can be utilized.

Although any alkali metal hydroxide can be used according to the above process, sodium hydroxide is preferred because of its availability and cost. An aqueous solution containing from about 20 to about 50 percent sodium hydroxide is further preferred. After the oxidized material is ground to a powder, it is charged to the alkali metal hydroxide at a temperature of at least about 20° C. At least the stoichiometric amount of the alkali metal hydroxide must be present to enable an alkali metal tungstate to be formed. An excess of about 50 percent of theory is preferred to ensure that all of the tungsten values are converted to a soluble tungsten form. The pressure used during digestion is generally from about 50 to 200 psig. The temperature used during digestion is generally from about 140° C. to 195° C. About 6 to 10 hours is required to convert the tungsten to a water soluble form at the foregoing temperatures and pressures. Higher pressures and higher temperatures tend to promote and shorten the time required, however, use of temperatures above 70° C. and pressures above 115 psig. do not appreciably effect the rate of reaction. Since it is more costly to use higher temperatures and pressures, the before recited temperatures are generally not exceeded.

In accordance with the above process, it has been found that an insoluble residue which is difficult to digest with the alkali metal hydroxide solution is formed. It is believed that the undesirable portion of the residue which is difficult to digest is a complex cobalt tungstate. Analysis of the insoluble residue indicates that at least a portion appears to have the chemical formula $CoWO_4$.

It has been found that aqueous solutions of sodium hydroxide will digest the insoluble residue if a sufficient concentration is used for a suitable time period. An excess of 400 to 900 percent of the theoretical amount of sodium hydroxide is preferably used in aqueous solutions having concentrations of 40 to 50 sodium hydroxide by weight percent.

The present invention provides for high yields while permitting the use of aqueous solutions having relatively lower concentrations of alkali metal hydroxide on the order of from about 20 to about 40 percent, more preferably from about 20 to about 30 percent alkali metal hydroxide by weight. The amount of alkali metal hydroxide employed is from about 50 percent to about 300 percent excess of the theoretical or stoichiometric amount needed. For obtaining high yields of soluble sodium tungstate greater than about 97 percent when the insoluble residue is $CoWO_4$, it has been found that aqueous sodium hydroxide solutions employed in amounts of from about 100 to 200 percent of the stoichiometric amount needed are sufficient.

In accordance with the principles of the present invention the oxidized product or insoluble residue from the above described process is digested in an aqueous alkali metal hydroxide solution in the presence of a suitable amount of titanium oxide to promote the formation of a soluble alkali metal tungstate. The concentration of alkali metal hydroxide used in the further digestion is preferably from about 20 to about 30 percent by weight. When the cementing agent is cobalt, a stoichiometric excess of titanium oxide is preferably used. About 300 percent excess of the stoichiometric amount of titanium oxide which would be required to react with cobalt present to form cobalt titanate has been found effective for inhancing the yield of soluble tungstate.

The oxidized product or dry insoluble residue is crushed and then blended with the solid titanium oxide particles to form a mixture. The blended mixture is preferably added to an aqueous alkali metal hydroxide. The aqueous mixture is agitated to a sufficient extent to obtain intimate contacting of the liquid and solid particles. The order of addition of the blended titanium oxide mixture to the aqueous sodium hydroxide solution does not appear to be critical. Within reasonable limits, the time needed for digestion of the oxidized product or insoluble residue is from about 5 to about 10 hours. The use of larger particle sizes of oxidized product, insoluble sludge, and titanium oxide, inefficient mixing, more dilute concentrations of alkali metal hydroxide, and lower temperatures all tend to increase the time required to form soluble tungstate.

To more fully illustrate the invention, the following detailed examples are presented. All parts and proportions are by weight unless otherwise indicated.

EXAMPLES

About 100 parts of a cemented tungsten carbide containing cobalt is fired in air for about 48 hours at 825° C. The hard carbide fired obtains a flower-like appearance which is crushed into a powder. The powder having a particle size of +200 mesh is mixed with titanium oxide powder of readily available commercial grade at the rate of 1 gram of titanium oxide per gram of tungstate as per Examples 2 and 4 of Table I. Examples 1 and 3 are given by way of comparison and represent the cases where no titanium oxide is used. The resulting blended mixtures as set forth in Examples 1-4 are digested with an aqueous solution containing 25 percent by weight for about 6 hours. The amount of aqueous solutions employed in each Example is set forth in column three of Table I and is based on the sodium hydroxide in excess of theoretical employed. The resulting product after digestion is filtered and the filtrate is analized for tungsten content. Based on the starting tungsten present in the initial residual sludge or insoluble portion, the percent efficiency of conversion to sodium tungstate is set forth in column four of Table I. Comparison of the results of Example 1 with 2 and 3 with 4 indicate a significant increase in efficiency with the addition $TiO_2$ to the residual sludge for a given set of digestion conditions.

TABLE I

| Material $CoWO_4$ is > .074nm | NaOH Conc. (%) | % NaOH in excess of theoretical to form $Na_2WO_4$ | PSIG | % Efficiency of Conversion to $Na_2WO_4$ |
|---|---|---|---|---|
| 1 $CoWO_4$ | 25 | 200 | 0 | 81 |
| 2 $CoWO_4$ + $TiO_2$ | 25 | 200 | 0 | >99 |
| 3 $CoWO_4$ | 25 | 100 | 90 | 79 |
| 4 $CoWO_4$ + $TiO_2$ | 25 | 100 | 90 | 98 |

While there have been shown and described what are considered the preferred embodiments of this invention, it will be obvious to those skilled in the art that various changes and modifications may be made therein without departing from the scope of the invention as defined in the appended claims.

I claim:

1. In a process for recovering tungsten from cemented tungsten carbide including cobalt as a cementing material wherein the cemented tungsten carbide is oxidized to form an oxidized product which is digested in an aqueous solution of an alkali metal hydroxide to form a water soluble alkali metal tungstate portion and an insoluble portion, the improvement comprising digesting with (in) an aqueous solution comprising about 20 to about 40 percent alkali metal hydroxide and in the presence of an excess of the theoretical amount of titanium dioxide needed to react with cobalt to form cobalt titanate, said digestion being carried out at a temperature greater than about 140° C. and a pressure greater than about 50 pounds per square inch to promote the formation of a soluble alkali metal tungstate.

* * * * *